US006722134B2

(12) United States Patent
Bunker

(10) Patent No.: US 6,722,134 B2
(45) Date of Patent: Apr. 20, 2004

(54) LINEAR SURFACE CONCAVITY ENHANCEMENT

(75) Inventor: Ronald Scott Bunker, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/065,115

(22) Filed: Sep. 18, 2002

(65) Prior Publication Data

US 2004/0052643 A1 Mar. 18, 2004

(51) Int. Cl.$^{7}$ .............................. F02C 7/18; F28F 1/00

(52) U.S. Cl. .......................... 60/752; 60/806; 165/133; 165/177

(58) Field of Search .......................... 60/752, 756, 757, 60/806; 165/133, 109.1, 177; 138/38

(56) References Cited

U.S. PATENT DOCUMENTS

| | | | | | |
|---|---|---|---|---|---|
| 1,848,375 | A | * | 3/1932 | Muir | 165/170 |
| 2,801,073 | A | | 7/1957 | Savage | |
| 2,938,333 | A | * | 5/1960 | Wetzler | 60/766 |
| 3,229,763 | A | * | 1/1966 | Rosenblad | 165/166 |
| 3,572,031 | A | | 3/1971 | Szetela | |
| 3,664,928 | A | * | 5/1972 | Roberts | 165/111 |
| 3,899,882 | A | | 8/1975 | Parker | |
| 4,158,949 | A | | 6/1979 | Reider | |
| 4,184,326 | A | | 1/1980 | Pane, Jr. et al. | |
| 4,690,211 | A | * | 9/1987 | Kuwahara et al. | 165/177 |
| 4,838,031 | A | | 6/1989 | Cramer | |
| 5,024,058 | A | | 6/1991 | Shekleton et al. | |
| 5,353,865 | A | | 10/1994 | Adiutori et al. | |
| 5,361,828 | A | | 11/1994 | Lee et al. | |
| 5,363,654 | A | | 11/1994 | Lee | |
| 5,419,039 | A | | 5/1995 | Auxier et al. | |
| 5,421,158 | A | | 6/1995 | Stenger et al. | |

(List continued on next page.)

FOREIGN PATENT DOCUMENTS

| | | | |
|---|---|---|---|
| JP | 61-280390 | * | 12/1986 |
| JP | 408110012 A | | 4/1996 |
| JP | 9-217994 | * | 8/1997 |
| JP | 2001-164901 A | * | 6/2001 |

OTHER PUBLICATIONS

"Corporate Research and Development Technical Report Abstract Page and Sections 1–2," Bunker et al., Oct. 2001.

"Corporate Research and Development Technical Report Section 3," Bunker et al., Oct. 2001.

"Thermohydraulics of Flow Over Isolated Depressions (Pits, Grooves) in a Smooth Wall," Afanas'yev et al., Heat Transfer Research, vol. 25, No. 1, 1993.

Mass/Heat Transfer in Rotating Dimpled Turbine–Blade Coolant Passages, Charya et al., Louisiana St. University, 2000.

(List continued on next page.)

*Primary Examiner*—Ted Kim
(74) *Attorney, Agent, or Firm*—Nixon & Vanderhye P.C.

(57) ABSTRACT

A turbine component having a surface provided with a heat transfer enhancement feature formed therein that includes at least one linear surface concavity comprised of plural overlapped surface concavities.

14 Claims, 4 Drawing Sheets

U.S. PATENT DOCUMENTS

| | | | | |
|---|---|---|---|---|
| 5,460,002 | A | | 10/1995 | Correa |
| 5,577,555 | A | * | 11/1996 | Hisajima et al. ............ 165/133 |
| 5,651,662 | A | | 7/1997 | Lee et al. |
| 5,660,525 | A | | 8/1997 | Lee et al. |
| 5,681,144 | A | | 10/1997 | Spring et al. |
| 5,695,321 | A | | 12/1997 | Kercher |
| 5,724,816 | A | | 3/1998 | Ritter et al. |
| 5,738,493 | A | | 4/1998 | Lee et al. |
| 5,758,503 | A | | 6/1998 | DuBell et al. |
| 5,797,726 | A | | 8/1998 | Lee |
| 5,822,853 | A | | 10/1998 | Ritter et al. |
| 5,933,699 | A | | 8/1999 | Ritter et al. |
| 5,975,850 | A | | 11/1999 | Abuaf et al. |
| 6,098,397 | A | | 8/2000 | Glezer et al. |
| 6,134,877 | A | | 10/2000 | Alkabie |
| 6,190,120 | B1 | | 2/2001 | Thatcher et al. |
| 6,237,344 | B1 | | 5/2001 | Lee |
| 6,314,716 | B1 | | 11/2001 | Abreu et al. |
| 6,334,310 | B1 | | 1/2002 | Sutcu et al. |
| 6,402,464 | B1 | | 6/2002 | Chiu et al. |
| 6,408,629 | B1 | | 6/2002 | Harris et al. |
| 6,412,268 | B1 | | 7/2002 | Cromer et al. |
| 6,468,669 | B1 | | 10/2002 | Hasz et al. |
| 6,494,044 | B1 | | 12/2002 | Bland |
| 6,504,274 | B2 | * | 1/2003 | Bunker et al. ................ 310/64 |
| 6,526,756 | B2 | | 3/2003 | Johnson et al. |
| 2001/0052411 | A1 | * | 12/2001 | Pantow et al. .............. 165/152 |

OTHER PUBLICATIONS

"Effect of Surface Curvature on Heat Transfer and Hydrodynamics within a Single Hemispherical Dimple," Proceedings of ASME Turboexpo 2000, May 8–11, 2000, Munich Germany.

"Concavity Enhanced Heat Transfer in an Internal Cooling Passage," Chyu et al., presented at the International Gas Turbine & Aeroengine Congress & Exhibition, Orlando, Florida, Jun. 2–5, 1997.

"Heat Transfer Augmentation Using Surfaces Formed by a System of Spherical Cavities," Belen'kiy et al., Heat Transfer Research, vol. 25, No. 2, 1993.

"Experimental Study of the Thermal and Hydraulic Characteristics of Heat–Transfer Surfaces Formed by Spherical Cavities," Institute of High Temperatures, Academy of Sciences of the USSR. Original article submitted Nov. 28, 1990.

"Turbulent Flow Friction and Heat Transfer Characteristics for Spherical Cavities on a Flat Plate," Afanasyev et al., Experimental Thermal and Fluid Science, 1993.

"Convective Heat Transfer in Turbulized Flow Past a Hemispherical Cavity," Heat Transfer Research, vol. 25, Nos. 2, 1993.

Patent Application Ser. No. 10/010,549, filed Nov. 8, 2001.

Patent Application Ser. No. 10/063,467, filed Apr. 25, 2002.

Patent Application Ser. No. 10/162,755, filed Jun. 6, 2002.

Patent Application Ser. No. 10/162,766, filed Jun. 6, 2002.

Patent Application Ser. No. 10/064,605, filed Jul. 30, 2002.

Patent Application Ser. No. 10/065,108, filed Sep. 18, 2002.

Patent Application Ser. No. 10/065,495, filed Oct. 24, 2002.

Patent Application Ser. No. 10/065,814, filed Nov. 22, 2002.

Patent Application Ser. No. 10/301,672, filed Nov. 22, 2002.

* cited by examiner

LINEAR SURFACE CONCAVITY ENHANCEMENT

BACKGROUND OF INVENTION

This invention relates to the enhancement of surface heat transfer for either heating or cooling in a variety of devices including gas turbine airfoils, combustion liners, transition pieces and the like. Specifically, the invention relates to unique linear surface concavities wherein each individual cavity overlaps an adjacent cavity by a discrete amount.

Enhancement of surface heat transfer for cooling (or heating) is required to improve thermal performance for a variety of devices, including gas turbine airfoils, combustor liners, transition pieces, or other heat transfer devices including plate fins on motors, generators, etc. Cooling mechanisms that provide high thermal enhancement factors with low enhancement of friction coefficients are sought for these applications.

Many surface treatments have been devised and used to address this problem. One very common method is the use of discrete turbulators, also known as "trip strips" or "rib rougheners," designed to disrupt the flow and thereby enhance heat transfer on the surface to be cooled. This method has very high pressure losses, however. Another common method is the use of arrays of pin fins or pedestals that protrude from a component wall into the flow. These act in similar fashion to turbulators, but are generally used in regions of more restricted geometry. A third method is the use of arrays of discrete surface concavities or dimples, which enhance heat transfer through the formation of flow vortices while maintaining a lower pressure loss compared to other methods. An example of the use of surface concavities on the cold side of a combustor liner is disclosed in U.S. Pat. No 6,098,397.

SUMMARY OF INVENTION

The present invention provides a unique geometry for a linear arrangement of concavities of various shapes, in which each concavity overlaps the adjacent concavity by a discrete amount. Arranged in a continuous line, this configuration may be referred to as a "linear surface concavity" and, in some circumstances, has distinct advantages over conventional cavity arrays.

By overlapping adjacent concavities, a continuous "channel" feature is provided with a continuous enhancement, i.e., there are no gaps between the concavities. It is crucial that the concavities overlap to provide this continuous enhancement mechanism, otherwise they will simply act as individual cooling enhancements. For example, turbulators have separated flow zones requiring certain minimum flow reattachment lengths between adjacent turbulators. This "linear surface concavity" design is also distinct from a constant cross section trench or channel, where there is no organized vortex formation capability. Thus, the linear surface concavity in accordance with this invention retains the capability to form organized vortices for flow and heat transfer enhancement with low pressure penalty, but does so with a maximum of surface coverage by the enhancement over the entire linear "front" of the concavity. This arrangement can be used in virtually in any application in which fins, turbulators or the like are currently used for thermal enhancement, such as cooling passages of turbine blades, cold and/or hot side surfaces of components such as combustor liners, transition pieces, etc. and/or cooling channels in such components. This feature lends itself especially to cases where only a single "row" of concavities can be fitted, but is equally suitable for multiple linear concavity arrangements.

Accordingly, in one aspect, the present invention relates to a machine component having a surface provided with a heat transfer enhancement feature formed therein comprising at least one linear surface concavity comprised of plural overlapped concavities.

In another aspect, the invention relates to a turbine component having a cooling channel in a wall of the component, the cooling channel defined in part by two opposed walls, at least one of the walls having a heat transfer enhancement feature formed therein that includes at least one linear surface concavity comprising a plurality of overlapped concavities.

The invention will now be described in conjunction with the following figures.

DETAILED DESCRIPTION

Figure 1:
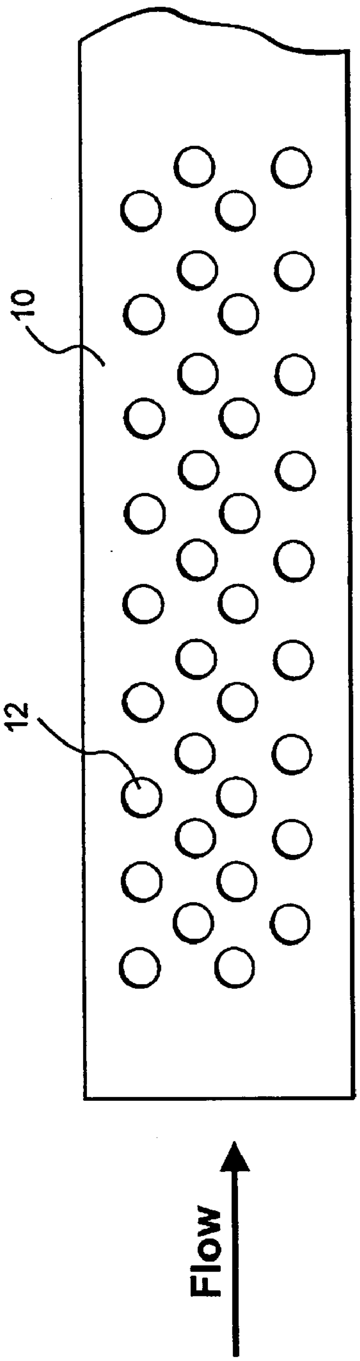
Fig. 1 (Prior Art)
FIG. 1 illustrates in schematic form, a known concavity array for surface cooling enhancement.

FIG. 1 shows a known arrangement or array of surface concavities on, for example, the cold side of a combustor liner. In other words, surface 10 of a combustor liner is the surface on the exterior of the liner, and the surface concavities 12 are in the form of discrete concave dimples arranged in rows, the dimples of one row offset in an axial direction from the dimples of the adjacent row.

Figure 2:
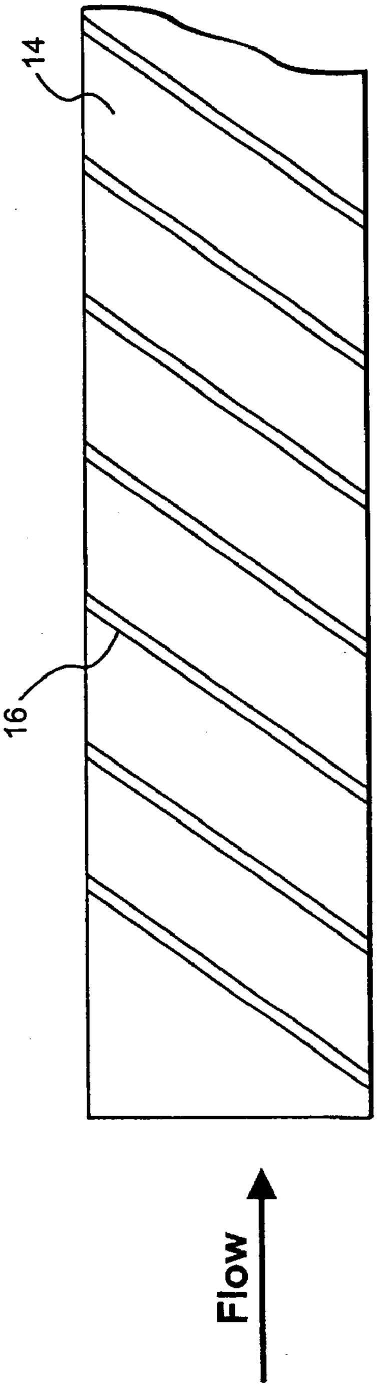
Fig. 2 (Prior Art)
FIG. 2 is a schematic diagram of a known array of angled turbulators.

FIG. 2 shows another prior arrangement where a surface 14 of, for example, a turbine airfoil cooling passage, is formed with a plurality of solid ribs or turbulators 16 extending at an angle to the flow. While these arrangements have been successful to a degree, the cooling enhancement in both instances is necessarily non-uniform, and critical spacing between the ribs is required to insure that the disrupted flow "reattaches" to the component surface between the surface discontinuities.

Figure 3:
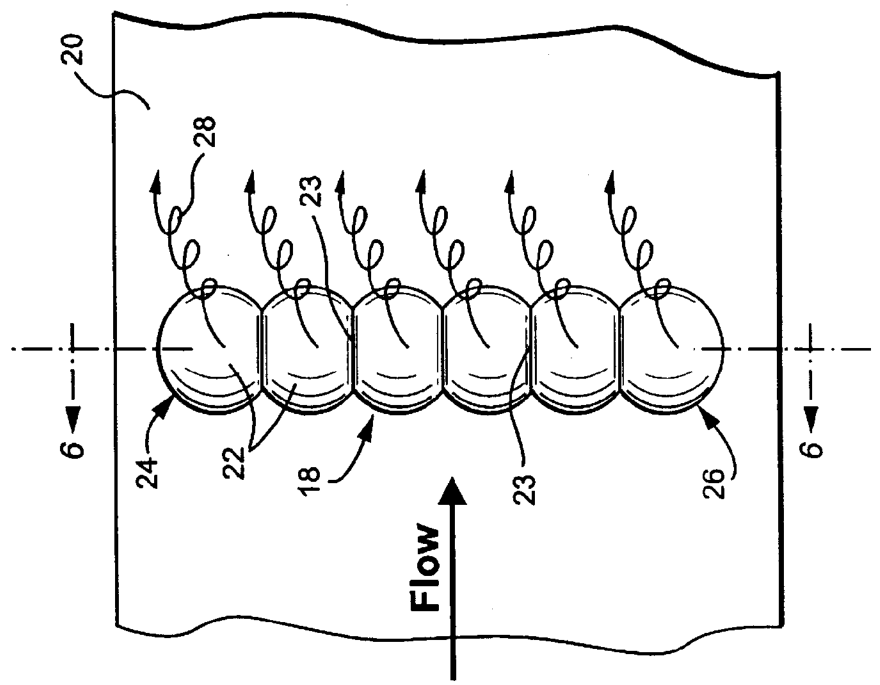
FIG. 3 is a plan view of a linear surface concavity in accordance with the present invention, arranged perpendicular to the direction of flow.

FIG. 3 shows a plan view of a linear surface concavity 18 formed on the surface 20 of a combustor liner or other component (or in a wall of a cooling channel in the component) requiring heat transfer enhancement. The individual concavities 22 of the linear surface concavity 18 overlap so that there is a generally continuous surface concavity from one end 24 to the opposite end 26. In this regard, note that adjacent concavities intersect at or along a line 23 that is below the surface 20 (see also FIG. 6). The number of individual concavities may vary as required. Because the linear surface concavities are overlapped, concerns over the spacing of discrete cavities to insure flow reattachment are eliminated and at the same time, the individual cavities continue to generate discrete vortices indicated at 28. The concavities shown are partly round and substantially hemispherical in shape. In other words, the concavities are derived from a geometrically round shape, but are truncated where they overlap with adjacent concavities. The concavities may thus be described as being of truncated hemispherical shape. It will be appreciated that other smooth shapes, such as ovals and truncated conical sections may be utilized as well. The nominal diameter and depth of the concavities may also vary, depending on cooling requirements.

Figure 4:
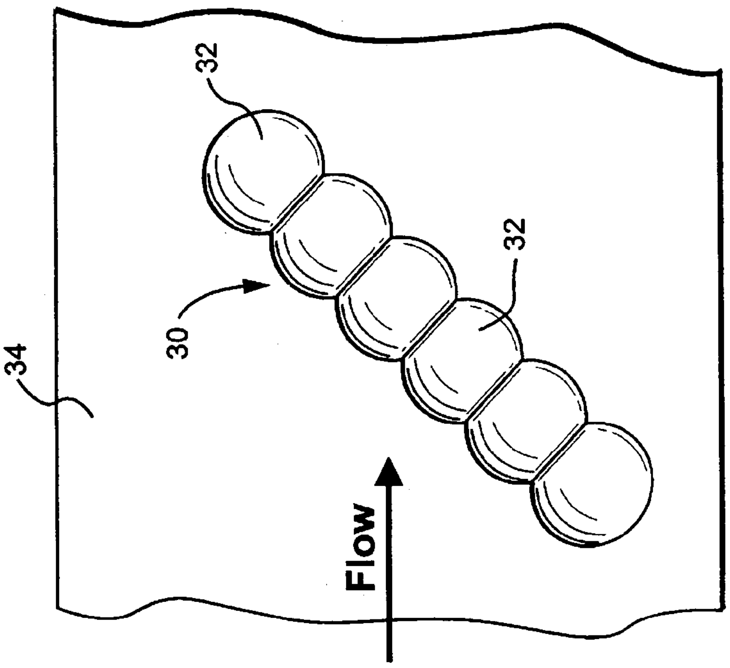
FIG. 4 is a plan view of a linear surface concavity similar to FIG. 3 but oriented at a 45° angle to the flow.

FIG. 4 shows an alternative arrangement where the linear surface concavity 30 having individually overlapped concavities 32 is formed on the surface 34 of a combustor liner or other component requiring heat transfer enhancement, where the linear surface concavity is arranged at about a 45° angle to the flow. The individual concavities and the manner of overlap is otherwise the same as in FIG. 3. For individual applications, it will be understood that the linear surface concavities may be arranged at any desirable angle up to about 45°. As mentioned above, the surface 34 could also be the radially inner or outer wall of a cooling channel formed in the component.

Figure 5:
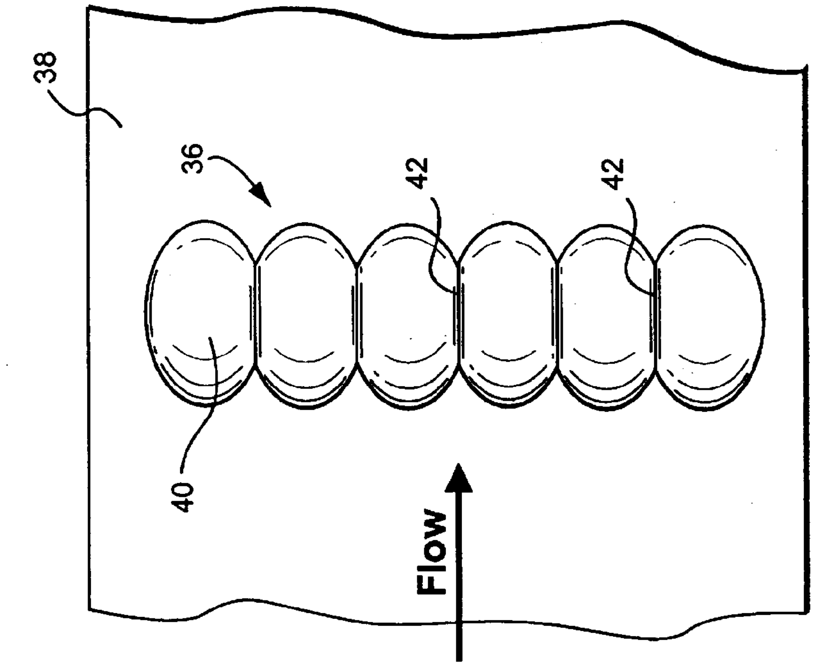
FIG. 5 is a plan view of a linear surface concavity in accordance with an alternative embodiment of the invention.

FIG. 5 shows an alternative arrangement where a linear surface concavity 36 is formed in a surface 38 and arranged perpendicular to the flow. The individual concavities 40 are oval in shape, as opposed to the round shape of the cavities in FIGS. 3 and 4. Note that the overlaps between adjacent concavities also occur along lines 42 that are at a height that is below the surface 38, thus insuring a distinct set of vortices over the entire length of the concavity.

Figure 6:
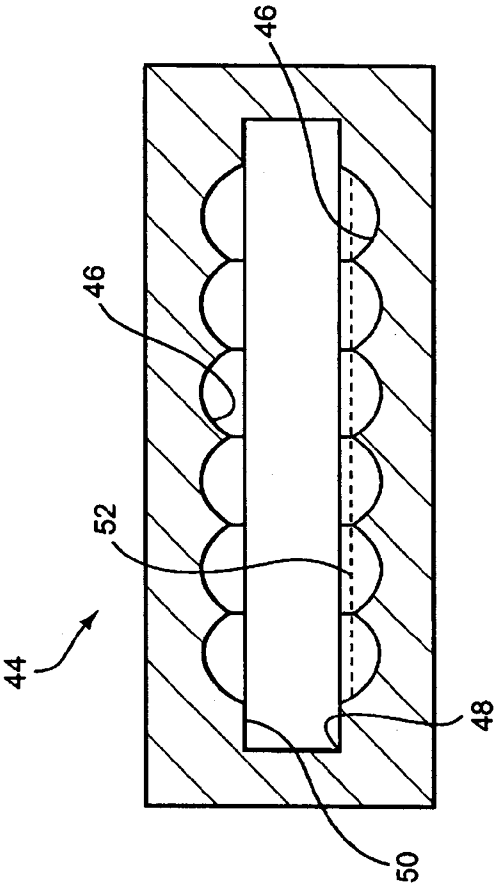
FIG. 6 is a diagram illustrating the cross sectional shape of the linear surface concavity shown in FIG. 5.

FIG. 6 shows a similar linear surface concavity configuration but in a cooling channel 44 of a turbine component. In this instance, linear surface concavities 46 are formed in the inner and outer (or hot and cold) surfaces 48, 50 of the channel. Overlaps again occur below surfaces 48, 50 (as indicated by dotted line 52 in the lower half of FIG. 6).

Figure 7:
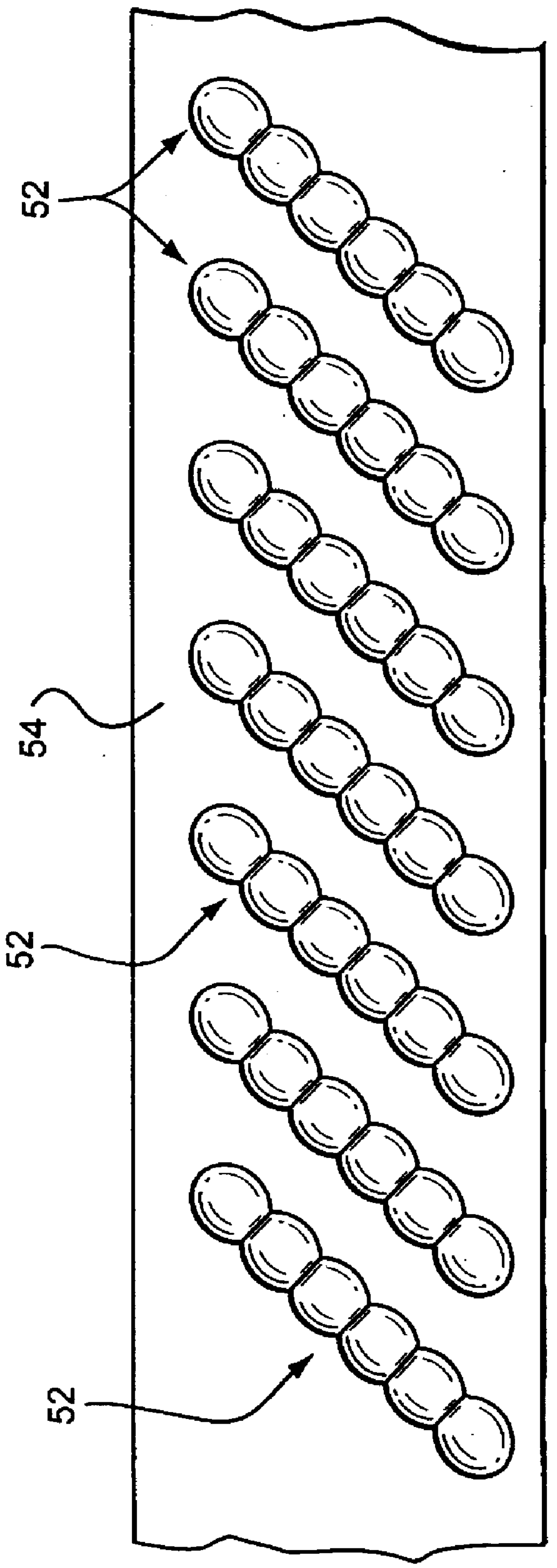
FIG. 7 is a plan view of an array of linear surface concavities oriented angularly with respect to flow but parallel to each other.

FIG. 7 shows plural linear surface concavities 54 formed in a surface 56 similar to the arrangement shown in FIG. 4, but wherein each of the linear surface concavities formed in surface 46 is arranged at an angle to flow and parallel to each other.

The linear surface concavities as described herein can be used singularly or in plural arrays on the inner and/or outer surfaces of a turbine combustion liner, transition piece, connecting segment between the combustion liner and transition piece or in cooling channels or passages formed in the combustion liner, transition piece, connecting segment, turbine airfoil, etc. Similarly, the concavities may be employed in connection with heat rejection plate fins on motors, generators, etc. When utilized in conjunction with cooling channels or passages, the linear surface concavities may be provided on one or both opposite walls of the channel or passage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A machine component having a heat transfer surface provided with a heat transfer enhancement feature formed thereon comprising at least one linear surface concavity comprised of plural overlapped concavities shaped and arranged so that, as air flows over said at least one linear surface concavity, discrete flow vortices are generated in said plural overlapped concavities while establishing a continuous channel between opposite ends of said linear surface concavity.

2. The machine component of claim 1 wherein said overlapped concavities each have a generally truncated hemispherical shape.

3. The machine component of claim 1 wherein said heat transfer feature comprises a plurality of linear surface concavities arranged in parallel.

4. The machine component of claim 1 wherein said heat transfer feature comprises a plurality of linear surface concavities arranged substantially perpendicular to a direction of flow over said plurality of linear surface concavities.

5. The machine component of claim 1 wherein said linear heat transfer feature comprises a plurality of linear surface concavities arranged at an acute angle to a direction of flow over said plurality of linear surface concavities.

6. The machine component of claim 1 wherein said surface comprises an inner surface of a cooling channel.

7. The machine component of claim 6 wherein a radially outer surface of said cooling channel is also formed with at least one linear surface concavity.

8. The machine component of claim 6 wherein said heat transfer enhancement feature comprises a plurality of linear surface concavities arranged in parallel on said radially inner surface of said cooling channel.

9. The machine component of claim 8 wherein said heat transfer feature comprises a plurality of linear surface concavities arranged in parallel on said radially outer surface of said cooling channel.

10. A turbine component having a cooling channel in a wall of the component, the cooling channel defined in part by two opposed walls, at least one of said walls having a heat transfer enhancement feature formed therein that includes at least one linear surface concavity comprising a plurality of overlapped concavities shaped and arranged so that, as air flows over said at least one linear surface concavity, discrete flow vortices are generated in said plural overlapped concavities while establishing a continuous channel between opposite ends of said linear surface concavity.

11. The turbine component of claim 10 wherein said overlapped concavities each have a generally truncated hemispherical shape.

12. The turbine component of claim 10 wherein said heat transfer feature comprises a plurality of linear surface concavities arranged in parallel.

13. The turbine component of claim 10 wherein said linear heat transfer feature comprises a plurality of linear surface concavities arranged substantially perpendicular to a direction of flow over said plurality of linear surface concavities.

14. The turbine component of claim 10 wherein said linear heat transfer feature comprises a plurality of surface concavities arranged at an acute angle to a direction of flow over said plurality of linear surface concavities.

* * * * *